(12) United States Patent
Shekhar et al.

(10) Patent No.: US 10,018,481 B1
(45) Date of Patent: Jul. 10, 2018

(54) MULTI-BAND PEDOMETER WITH MOBILITY MODE INDICATOR

(71) Applicant: InvenSense, Inc., San Jose, CA (US)

(72) Inventors: Hemabh Shekhar, San Jose, CA (US); Dhruv Srivastava, Sunnyvale, CA (US); Shang Hung Lin, San Jose, CA (US); Sankalita Saha, Redwood Shores, CA (US)

(73) Assignee: Worldwise, Inc., San Jose, CA (US)

( * ) Notice: Subject to any disclaimer, the term of this patent is extended or adjusted under 35 U.S.C. 154(b) by 512 days.

(21) Appl. No.: 14/502,168

(22) Filed: Sep. 30, 2014

(51) Int. Cl.
*G01C 22/00* (2006.01)

(52) U.S. Cl.
CPC .................... *G01C 22/006* (2013.01)

(58) Field of Classification Search
CPC .............. G01C 22/006; G01C 22/00
USPC ......................................... 702/160
See application file for complete search history.

(56) References Cited

U.S. PATENT DOCUMENTS

| | | | | |
|---|---|---|---|---|
| 8,280,679 B2* | 10/2012 | Maxwell | ............. | A61B 5/1038 702/160 |
| 2013/0085711 A1* | 4/2013 | Modi | .................. | G01C 22/006 702/141 |
| 2014/0122012 A1* | 5/2014 | Barfield | .............. | G01C 22/006 702/138 |
| 2014/0275854 A1* | 9/2014 | Venkatraman | ........ | A61B 5/721 600/301 |
| 2014/0278139 A1* | 9/2014 | Hong | .................. | A61B 5/4866 702/19 |

* cited by examiner

*Primary Examiner* — Bryan Bui
(74) *Attorney, Agent, or Firm* — Bay Area Technology Law Group PC

(57) ABSTRACT

A system and method for reliably counting user steps. Various aspects may, for example, comprise processing a plurality of frequency bands of at least one sensor signal to accurately count user steps. A plurality of filtered sensor signals may be formed by filtering a sensor signal with a plurality of band-pass filters from which a dominant filtered sensor signal may be selected. The selected dominant filtered sensor signal may then be used to count user steps. Further, a frequency band of a sensor signal may be selected such that if it is determined the user is not engaged in a non-stepping activity, user steps may be counted using the content of the signal in the selected frequency band. Still further, user steps may be counted using an identified dominant harmonic.

15 Claims, 10 Drawing Sheets

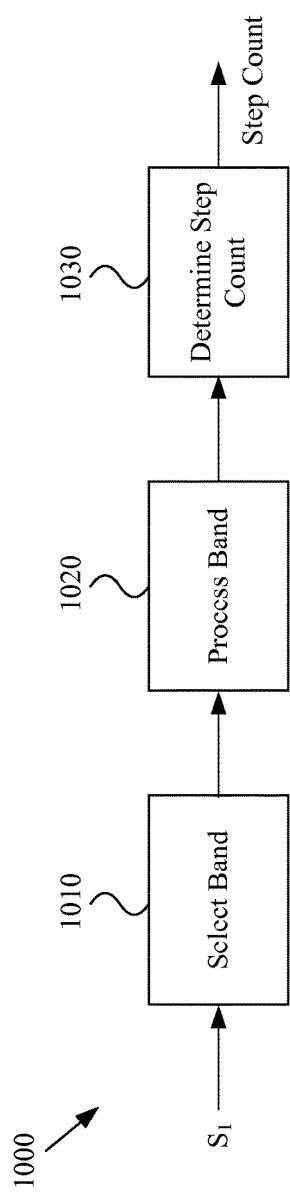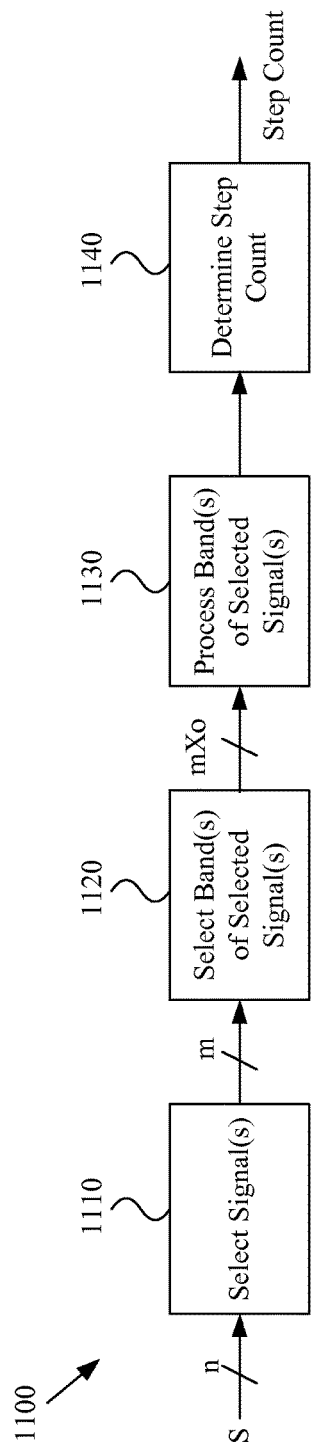
Figure 10
Figure 11

MULTI-BAND PEDOMETER WITH MOBILITY MODE INDICATOR

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

For pedometers and the like, step count accuracy is important. A substantial percentage of false step detections and/or missed step detections may be prevented by signal processing in accordance with various aspects of this disclosure. Further limitations and disadvantages of conventional and traditional approaches will become apparent to one of skill in the art, through comparison of such approaches with the disclosure as set forth in the remainder of this application with reference to the drawings.

BRIEF DESCRIPTION OF SEVERAL VIEWS OF THE DRAWINGS

FIG. 10 shows an example multi-band step counting system, in accordance with various aspects of the present disclosure.

FIG. 11 shows an example multi-band step counting system, in accordance with various aspects of the present disclosure.

SUMMARY

Figure 1:
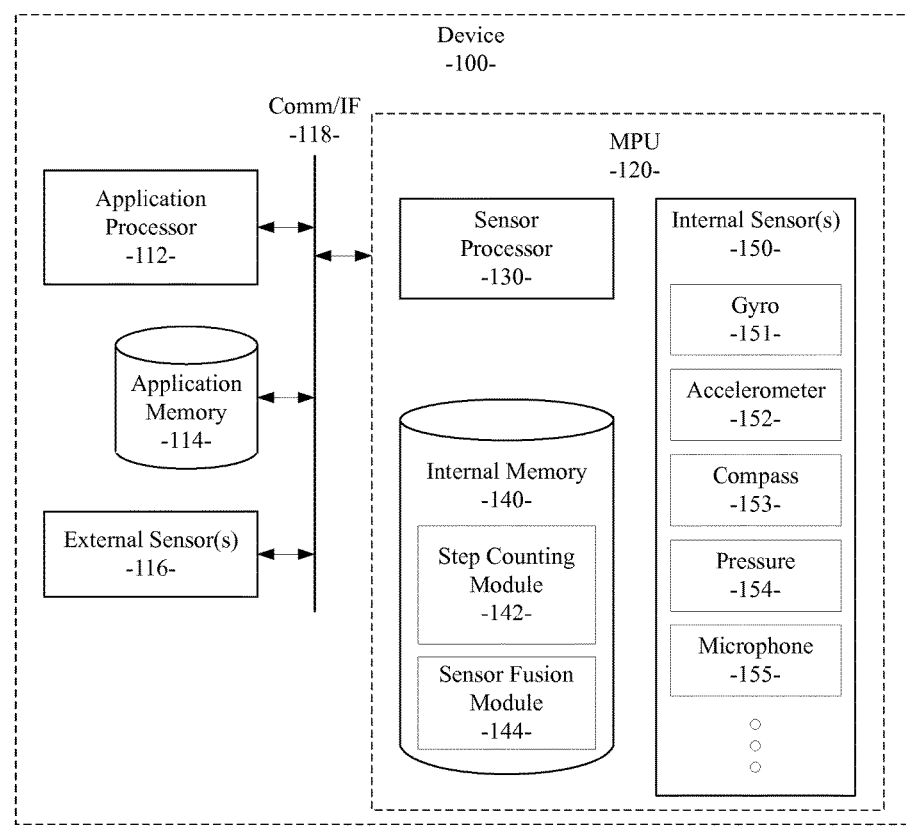
FIG. 1 shows a block diagram of an example electronic device comprising pedometer capability, in accordance with various aspects of the present disclosure.

Various aspects of this disclosure comprise a system and method for reliably counting user steps. Various aspects may, for example, comprise processing a plurality of frequency bands of at least one sensor signal to accurately count user steps. In a non-limiting example, a frequency band of a plurality of frequency bands may be intelligently selected as a primary frequency band of interest based, at least in part, on signal characteristics in each of the plurality of frequency bands. The signal content in the selected primary frequency band of interest may then be processed, for example alone and/or in combination with other frequency bands, to obtain an accurate step count.

DETAILED DESCRIPTION OF VARIOUS ASPECTS OF THE DISCLOSURE

The following discussion presents various aspects of the present disclosure by providing various examples thereof. Such examples are non-limiting, and thus the scope of various aspects of the present disclosure should not necessarily be limited by any particular characteristics of the provided examples. In the following discussion, the phrases "for example" and "e.g." and "exemplary" are non-limiting and are generally synonymous with "by way of example and not limitation," "for example and not limitation," and the like.

The following discussion may at times utilize the phrase "A and/or B." Such phrase should be understood to mean A, or B, or both A and B. Similarly, the phrase "A, B, and/or C" should be understood to mean just A, just B, just C, A and B, A and C, B and C, or all of A and B and C.

The following discussion may at times utilize the phrases "operable to," "operates to," and the like in discussing functionality performed by particular hardware, including hardware operating in accordance with software instructions. The phrases "operates to," "is operable to," and the like include "operates when enabled to." For example, a module that operates to perform a particular operation, but only after receiving a signal to enable such operation, is included by the phrases "operates to," "is operable to," and the like.

The following discussion may at times refer to various system or device functional modules. It should be understood that the functional modules were selected for illustrative clarity and not necessarily for providing distinctly separate hardware and/or software modules. For example, any one or more of the modules discussed herein may be implemented by shared hardware, including for example a shared processor. Also for example, any one or more of the modules discussed herein may share software portions, including for example subroutines. Additionally for example, any one or more of the modules discussed herein may be implemented with independent dedicated hardware and/or software. Accordingly, the scope of various aspects of this disclosure should not be limited by arbitrary boundaries between modules unless explicitly claimed. Additionally, it should be understood that when the discussion herein refers to a module performing a function, the discussion is generally referring to either a pure hardware module implementation and/or a processor operating in accordance with software. Such software may, for example, be stored on a non-transitory machine-readable medium.

In various example embodiments discussed herein, a chip is defined to include at least one substrate typically formed from a semiconductor material. A single chip may for example be formed from multiple substrates, where the substrates are mechanically bonded to preserve the functionality. Multiple chip (or multi-chip) includes at least 2 substrates, wherein the 2 substrates are electrically connected, but do not require mechanical bonding.

A package provides electrical connection between the bond pads on the chip (or for example a multi-chip module) and a metal lead that can be soldered to a printed circuit board (or PCB). A package typically comprises a substrate and a cover. An Integrated Circuit (IC) substrate may refer to a silicon substrate with electrical circuits, typically CMOS circuits. A MEMS substrate provides mechanical support for the MEMS structure(s). The MEMS structural layer is attached to the MEMS substrate. The MEMS substrate is also referred to as handle substrate or handle wafer. In some embodiments, the handle substrate serves as a cap to the MEMS structure.

In the described embodiments, an electronic device incorporating a sensor may, for example, employ a motion tracking module also referred to as Motion Processing Unit (MPU) that includes at least one sensor in addition to electronic circuits. The at least one sensor may comprise any one or more of a variety of sensors, such as for example a gyroscope, a compass, a magnetometer, an accelerometer, a microphone, a pressure sensor, a proximity sensor, a moisture sensor, a temperature sensor, a biometric sensor, or an ambient light sensor, among others known in the art.

Some embodiments may, for example, comprise an accelerometer, gyroscope, and magnetometer or other compass technology, which each provide a measurement along three axes that are orthogonal relative to each other, and may be referred to as 9-axis devices. Other embodiments may, for example, comprise an accelerometer, gyroscope, compass, and pressure sensor, and may be referred to as 10-axis devices. Other embodiments may not include all the sensors or may provide measurements along one or more axes.

The sensors may, for example, be formed on a first substrate. Various embodiments may, for example, include solid-state sensors and/or any other type of sensors. The electronic circuits in the MPU may, for example, receive measurement outputs from the one or more sensors. In various embodiments, the electronic circuits process the sensor data. The electronic circuits may, for example, be implemented on a second silicon substrate. In some embodiments, the first substrate may be vertically stacked, attached and electrically connected to the second substrate in a single semiconductor chip, while in other embodiments, the first substrate may be disposed laterally and electrically connected to the second substrate in a single semiconductor package (e.g., both attached to a common packaging substrate or other material). In other embodiments, the sensors may, for example, be formed on different respective substrates (e.g., all attached to a common packaging substrate or other material).

In an example embodiment, the first substrate is attached to the second substrate through wafer bonding, as described in commonly owned U.S. Pat. No. 7,104,129, which is hereby incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

In the described embodiments, raw data refers to measurement outputs from the sensors which are not yet processed. Motion data refers to processed raw data. Processing may, for example, comprise applying a sensor fusion algorithm or applying any other algorithm. In the case of a sensor fusion algorithm, data from one or more sensors may be combined and/or processed to provide an orientation of the device. In the described embodiments, an MPU may include processors, memory, control logic and sensors among structures.

Step counting, for example for a pedometer, general health monitoring device, smart phone with step counting capability, etc., is useful. For example, there are many commercially available products that provide step counting functionality as a way of monitoring and/or incentivizing exercise. Accurately and efficiently counting steps, however, provides many challenges. Accordingly, various aspects of the present disclosure provide non-limiting examples of systems and method for accurately counting user steps. The discussion will now turn to discussing the attached figures.

Turning first to FIG. 1, such figure shows a block diagram of an example electronic device 100 comprising pedometer (e.g., step-counting) capability, in accordance with various aspects of the present disclosure. As will be appreciated, the device 100 may be implemented as a device or apparatus, such as a handheld and/or wearable device that can be moved in space by a user, and its motion and/or orientation in space therefore sensed. For example, such a handheld and/or wearable device may be a mobile phone (e.g., a cellular phone, a phone running on a local network, or any other telephone handset), wired telephone (e.g., a phone attached by a wire and/or optical tether), personal digital assistant (PDA), pedometer, personal activity and/or health monitoring device, video game player, video game controller, navigation device, mobile internet device (MID), personal navigation device (PND), digital still camera, digital video camera, binoculars, telephoto lens, portable music, video, or media player, remote control, or other handheld device, or a combination of one or more of these devices.

In some embodiments, the device 100 may be a self-contained device that comprises its own display and/or other user output devices in addition to the user input devices as described below. However, in other embodiments, the device 100 may function in conjunction with another portable device or a non-portable device such as a desktop computer, electronic tabletop device, server computer, smart phone, etc., which can communicate with the device 100, e.g., via network connections. The device 100 may, for example, be capable of communicating via a wired connection using any type of wire-based communication protocol (e.g., serial transmissions, parallel transmissions, packet-based data communications), wireless connection (e.g., electromagnetic radiation, infrared radiation or other wireless technology), or a combination of one or more wired connections and one or more wireless connections.

As shown, the example device 100 comprises an MPU 120, application (or host) processor 112, application (or host) memory 114, and may comprise one or more sensors, such as external sensor(s) 116. The application processor 112 may, for example, be configured to perform the various computations and operations involved with the general function of the device 100 (e.g., running applications, performing operating system functions, performing power management functionality, controlling user interface functionality for the device 100, etc.). The application processor 112 may, for example, be coupled to MPU 120 through a communication interface 118, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, or other equivalent. The application memory 114 may, for example, comprise programs, drivers or other data that utilize information provided by the MPU 120. Details regarding example suitable configurations of the application (or host) processor 112 and MPU 120 may be found in co-pending, commonly owned U.S. patent application Ser. No. 12/106,921, filed Apr. 21, 2008, which is hereby incorporated herein by reference in its entirety.

In this example embodiment, the MPU 120 is shown to comprise a sensor processor 130, internal memory 140 and one or more internal sensors 150. The internal sensors 150 comprise a gyroscope 151, an accelerometer 152, a compass 153 (for example a magnetometer), a pressure sensor 154, and a microphone 155. Though not shown, the internal sensors 150 may comprise any of a variety of sensors, for example, a proximity sensor, temperature sensor, light sensor, moisture sensor, biometric sensor, etc. The internal sensors 150 may, for example, be implemented as MEMS-based motion sensors, including inertial sensors such as a gyroscope or accelerometer, or an electromagnetic sensor such as a Hall effect or Lorentz field magnetometer. As desired, one or more of the internal sensors 150 may be configured to provide raw data output measured along three orthogonal axes or any equivalent structure. The internal memory 140 may store algorithms, routines or other instructions for processing data output by one or more of the internal sensors 120, including the step counting software module 142 and sensor fusion module 144, as described in more detail herein. If provided, external sensor(s) 116 may comprise one or more sensors, such as accelerometers, gyroscopes, magnetometers, pressure sensors, microphones, proximity sensors, and ambient light sensors, biometric sensors, temperature sensors, and moisture sensors, among other sensors. As used herein, an internal sensor generally refers to a sensor implemented, for example using MEMS techniques, for integration with the MPU 120 into a single chip. Similarly, an external sensor as used herein generally refers to a sensor carried on-board the device 100 that is not integrated into the MPU 120.

Even though various embodiments may be described herein in the context of internal sensors implemented in the MPU 120, these techniques may be applied to a non-integrated sensor, such as an external sensor 116, and likewise step counting software module 142 may be implemented using instructions stored in any available memory resource, such as for example the application memory 114, and may be executed using any available processor, such as for example the application processor 112. Still further, the functionality performed by the step counting software module 142 may be implemented using any combination of hardware, firmware and software.

As will be appreciated, the application (or host) processor 112 and/or sensor processor 130 may be one or more microprocessors, central processing units (CPUs), microcontrollers or other processors, which run software programs for the device 100 and/or for other applications related to the functionality of the device 100. For example, different software application programs such as menu navigation software, games, camera function control, navigation software, and telephone, or a wide variety of other software and functional interfaces, can be provided. In some embodiments, multiple different applications can be provided on a single device 100, and in some of those embodiments, multiple applications can run simultaneously on the device 100. Multiple layers of software can, for example, be provided on a computer readable medium such as electronic memory or other storage medium such as hard disk, optical disk, flash drive, etc., for use with application processor 112 and sensor processor 130. For example, an operating system layer can be provided for the device 100 to control and manage system resources in real time, enable functions of application software and other layers, and interface application programs with other software and functions of the device 100. In various example embodiments, one or more motion algorithm layers may provide motion algorithms for lower-level processing of raw sensor data provided from internal or external sensors. Further, a sensor device driver layer may provide a software interface to the hardware sensors of the device 100. Some or all of these layers can be provided in the application memory 114 for access by the application processor 112, in internal memory 140 for access by the sensor processor 130, or in any other suitable architecture (e.g., including distributed architectures).

In some example embodiments, it will be recognized that the example architecture depicted in FIG. 1 may provide for step counting to be performed using the MPU 120 and might not require involvement of the application (or host) processor 112 and/or application memory 114. Such example embodiments may, for example, be implemented with one or more internal sensor sensors 150 on a single substrate. Moreover, as will be described below, the step counting techniques may be implemented using computationally efficient algorithms to reduce processing overhead and power consumption.

As discussed herein, various aspects of this disclosure may, for example, comprise processing various sensor signals indicative of device orientation. Non-limiting examples of such signals are signals that indicate accelerometer orientation along the z-axis (or gravitational axis) in a world coordinate system.

In an example implementation, an accelerometer and/or associated circuitry may output a vector indicative of device (or accelerometer) acceleration. For example, such a vector may express respective acceleration components along the x, y, and z axes of a body (or device, or component) coordinate system. Such a vector may be processed by a transformation function, for example based on sensor fusion calculations, that transforms the accelerometer vector to a world coordinate system (e.g., based on gyroscope signals, compass signals, etc.). For example, an accelerometer vector $[A_b^x, A_b^y, A_b^z]$ in body (or device or component) coordinates may be transformed to an accelerometer vector $[A_w^x, A_w^y, A_w^z]$ in world coordinates.

Portions of discussion herein may focus on the z-axis component of the accelerometer vector expressed in the world coordinate system, for example $A_w^z$. Other portions of the discussion herein may focus on the x, y, and/or z axes of the accelerometer vector expressed in the world coordinate system, for example $[A_w^x, A_w^y, A_w^z]$. Still other portions of the discussion herein may focus on the x, y, and/or z axes of the accelerometer vector expressed in the body coordinate system, for example $[A_b^x, A_b^y, A_b^z]$. Accordingly, the scope of this disclosure is not limited by the particular signal(s) and/or signal combinations discussed herein.

As mentioned herein, a step counting module may be implemented by a processor (e.g., the sensor processor 130) operating in accordance with software instructions (e.g., the step counting software module 142 stored in the internal memory 140), or by a pure hardware solution. The discussion of FIGS. 2-11 will provide further example details of at least the operation of the sensor fusion software module 144 and the step counting software module 142 (e.g., when executed by a processor such as the sensor processor 130). It should be understood that any or all of the functional modules discussed herein may be implemented in a pure hardware implementation and/or by a processor operating in accordance with software instructions. It should also be understood that any or all software instructions may be stored in a non-transitory computer-readable medium.

Various aspects of this disclosure comprise processing various frequency bands of one or more signals indicative of device orientation and/or movement. Examples of such signals may, for example, comprise a signal that indicates accelerometer orientation along the z-axis (or gravitational axis) in a world coordinate system, signals that indicate accelerometer orientation along any or all axes in a world coordinate system, gyroscope signals along any or all axes in a world coordinate system, etc.

In an example implementation, an accelerometer and/or associated circuitry may output a vector indicative of device (or accelerometer) orientation. Such a vector may, for example, initially be expressed in a body (or device) coordinate system. Such a vector may be processed by a transformation function, for example based on sensor fusion calculations, that transforms the accelerometer vector to a world coordinate system. For example, an accelerometer vector $A_b = [A_b^x, A_b^y, A_b^z]$ in body (or device) coordinates may be transformed to an accelerometer vector $A_w = [A_w^x, A_w^y, A_w^z]$ in world coordinates.

Portions of the following discussion may generally focus on the z-axis component of the accelerometer vector in the world coordinate system, for example $A_w^z$. It should be noted, however, that the scope of this disclosure is not limited by the particular signal(s) and/or coordinate system(s) discussed herein.

One of the challenges in accurately counting user steps with a user device, for example a handheld device (e.g., a mobile phone) and/or a wearable device (e.g., a watch or belt-mounted device), is that the orientation of the device or how the user carries the device varies from user to user and from moment to moment. For example, a user may carry a device in-hand, in a pocket, on a belt, on a wrist, on a leg or ankle, etc.

Through empirical studies, it has been determined that the $A_w^z$ signal, and/or other accelerometer or inertial sensor signals, includes a variety of frequency spectrum components that are associated with particular user activities and also associated with the manner in which a user is carrying or wearing a device. For example, the $A_w^z$ signal will generally comprise one or more frequency components (e.g., the existence or absence thereof) associated with walking and/or running, one or more frequency components (e.g., the existence or absence thereof) associated with biking, one or more frequency components (e.g., the existence or absence thereof) associated with driving and/or riding in a motor vehicle, one or more frequency components (e.g., the existence or absence thereof) associated with being generally stationary, etc. Additionally for example, such frequency components are also indicative of a manner in which the user is holding and/or wearing the device. The same is true with other accelerometer signals, with gyroscope signals, with microphone signals, with pressure sensor signals, and other sensor signals. Thus, although for illustrative purposes various parts of the following discussion will focus on the $A_w^z$ signal, the scope of this disclosure is not limited to the analysis of such signal.

In the following discussion, such frequency spectrum components may be referred to as "harmonics." Such reference is for illustrative clarity and is not intended to limit the scope of the disclosure. The $A_w^z$ signal may, for example, generally comprise a first harmonic generally associated with motion of a single leg, for example indicative of every other step, and a second harmonic generally associated with motion of both legs, for example indicative of every step. Additional harmonics are also present and, as shown herein, may also be included in the step-counting analysis.

Depending on the manner in which a user is carrying a device, the first or second harmonic may dominate. For example, in most scenarios a pedometer (or mobile phone or other device with pedometer capability) is carried in a pants packet, shirt pocket, backpack, belt clip, etc., and in such cases the second harmonic has generally been found to be dominant. Also for example, in a scenario in which a user is holding the pedometer (or mobile phone or other device with pedometer capability) in a hand swinging at the user's side in a typical walking motion, worn as a wristwatch, etc., the first harmonic has generally been found to be dominant. As discussed herein, to enhance the accuracy of a pedometer step count, determining and analyzing at least the dominant harmonic has been found to be advantageous.

Figure 2A:
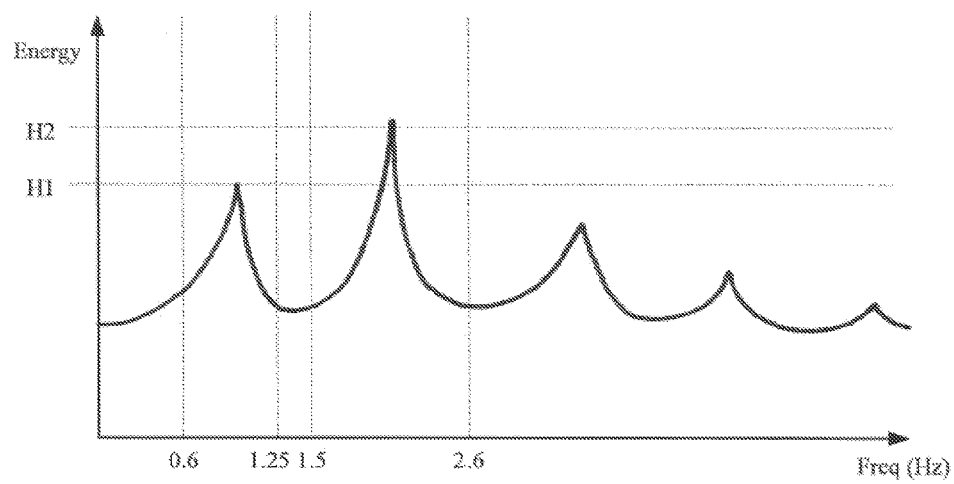
FIG. 2A shows an example frequency spectrum for an accelerometer signal, in accordance with various aspects of the present disclosure.

Illustratively, FIG. 2A shows an example frequency spectrum for an $A_w^z$ signal associated with a device (e.g., a pedometer, a mobile phone or other device with pedometer capability, etc.) carried in a packet, in a backpack, on a belt clip, etc. Notice that in such a usage scenario, the energy of the second harmonic component with magnitude H2 may be dominant, for example higher than all other components including the first harmonic component with magnitude H1. The location of the second harmonic has been found to generally be in the 1.5 Hz to 2.6 Hz range, but this range may vary, for example depending on the user's cadence. In such a scenario, it is advantageous for step-count accuracy to analyze at least the dominant second harmonic component. For example, the main (or primary) frequency of the dominant second harmonic may indicate a user stepping rate.

Figure 2B:
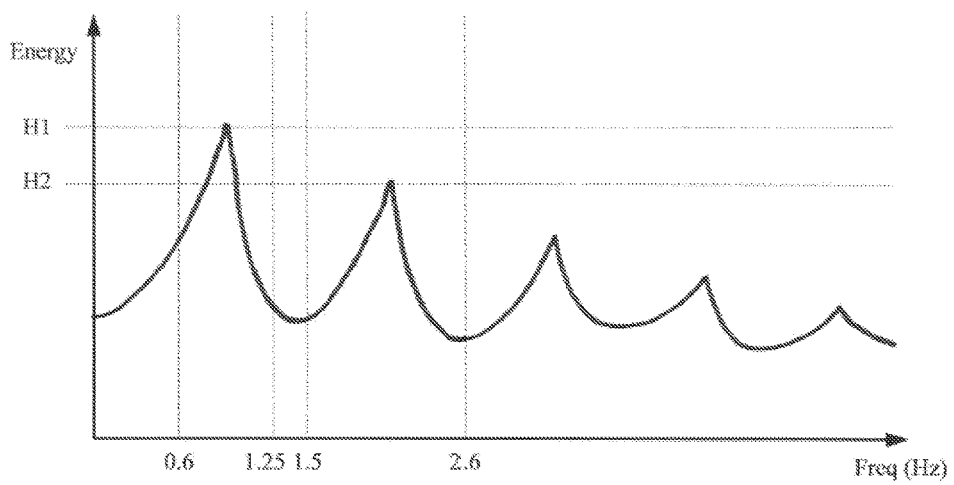
FIG. 2B shows an example frequency spectrum for an accelerometer signal, in accordance with various aspects of the present disclosure.

Also illustratively, FIG. 2B shows an example frequency spectrum for the $A_w^z$ signal associated with a device (e.g., a pedometer, a mobile phone or other device with pedometer capability, etc.) held in a user's hand or attached to a user's wrist swinging at the user's side in a typical walking motion. Notice that in such a usage scenario, the energy of the first harmonic component with magnitude H1 may be dominant, for example higher than all other components including the second harmonic component with magnitude H2. The location of the first harmonic has been found to generally be in the 0.6 Hz to 1.25 Hz range, but this range may vary, for example depending on the user's cadence. In such a scenario, it is advantageous for step-count accuracy to analyze at least the dominant first harmonic component. For example, the main (or primary) frequency of the dominant first harmonic may indicate half a user stepping rate.

As mentioned herein, the manner in which a user is carrying a device affects the manner in which sensor signals should be analyzed to count steps. This disclosure will now present an example system for implementing such analysis.

Figure 3:
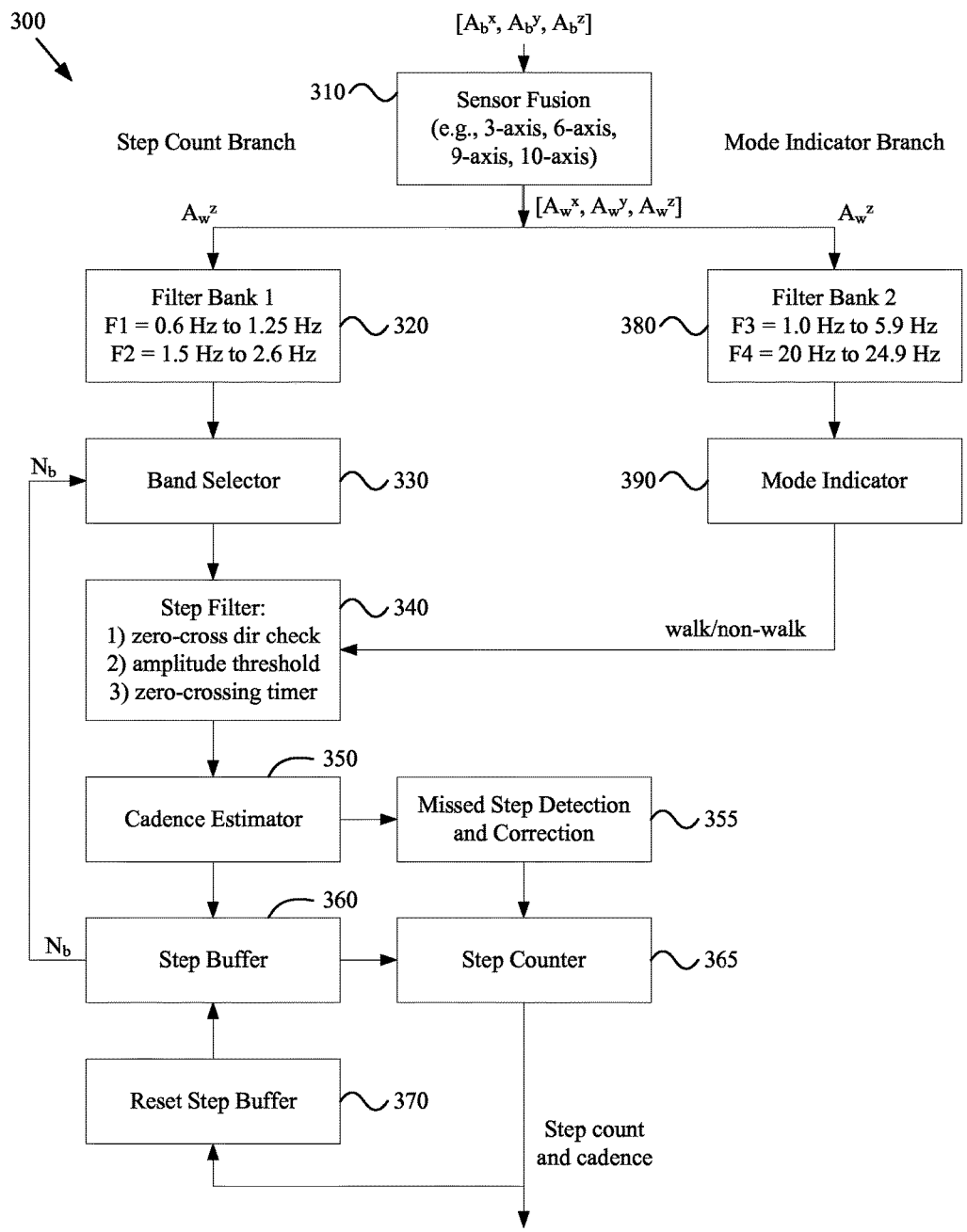
FIG. 3 shows an example multi-band step counting system, in accordance with various aspects of the present disclosure.

Turning now to FIG. 3, such figure shows an example multi-band step counting system 300 (e.g., a pedometer system), in accordance with various aspects of the present disclosure. It should be understood that the example system 300 illustrated in FIG. 3 and discussed below is merely an illustrative example, and the scope of various aspects of this disclosure should not be limited by particular characteristics of such illustrative example The system 300 may, for example, be implemented by any or all of the components of the device 100 illustrated in FIG. 1 and discussed herein. For example, any or all aspects of the system 300 may be implemented by the MPU 120, including for example by the sensor processor 130 operating in accordance with software instructions of the step counting software module 142 and/or the sensor fusion software module 144. Also for example, any or all aspects of the system 300 may be implemented by the application processor 112 operating in accordance with software instructions stored in the application memory 114.

An accelerometer vector expressed in a body coordinate system (e.g., $[A_b^x, A_b^y, A_b^z]$) may be input to the system 300. A processing module with coordinate transformation capability, for example a sensor fusion module 310, may receive the input accelerometer vector and transform the accelerometer vector to a world coordinate system (e.g., $[A_w^x, A_w^y, A_w^z]$). As mentioned herein, the following discussion will focus primarily on analysis of the z-axis (or gravity axis) component of the world coordinate accelerometer vector, but the scope of various aspects of this disclosure is not limited to the analysis of such signal, nor to the analysis of only one accelerometer signal, nor to the analysis of signal(s) from only one sensor.

The example system 300 includes a Step Count Branch, generally on the left side of FIG. 3, and a Mode Indicator Branch, generally on the right side of FIG. 3. The Step Count Branch will be discussed first, followed by the Mode Indicator Branch.

Regarding the Step Count Branch, the z-axis component of the accelerometer vector in world coordinates, $A_w^z$ is provided by the sensor fusion module 310 to a first filter bank module 320, which is a filter bank comprising a plurality of filters. A first filter F1 may, for example, comprise a bandpass filter with corner frequencies at 0.6 Hz and 1.25 Hz, generally passing 0.6 Hz to 1.25 Hz frequency components of the $A_w^z$ signal. A second filter F2 may, for example, comprise a bandpass filter with corner frequencies at 1.5 Hz and 2.6 Hz, generally passing 1.5 Hz to 2.6 Hz frequency components of the $A_w^z$ signal. There may also be additional filters, but only two are shown for illustrative clarity. The example corner frequencies are shown in FIG. 2A and FIG. 2B in relation to the example frequency spectra. With reference to FIG. 2A and FIG. 2B, the first filter F1 is generally tuned to pass the energy corresponding to the first harmonic, and the second filter F2 is generally tuned to pass the energy corresponding to the second harmonic.

The filter corner frequencies may also vary, but have been chosen for illustrative purposes and for being shown to empirically yield good results. For example, the corner frequencies may be adjusted over time to gain an understanding of where peak energy occurs for a particular user. For example, considering the first filter F1, over time the 0.6 Hz and/or 1.25 Hz corner frequencies may be moved and the resulting filtered signal analyzed to develop an understanding of the location of the first harmonic peaks for the user. The corner frequencies of the first filter F1 may then be adapted to be less than and greater than the empirically-determined peak by a particular margin. The same adaptation may be applied to the second filter F2, either independently and/or using the results for the first filter F1 (e.g., doubling the peak frequency determined for the first filter F1).

The first filter bank 320 may, for example, utilize the first and/or second filters for the adaptive analysis, but may also comprise a third filter (not shown) for performing such analysis without impacting real-time operation of the system 300. Note that the adaptive analysis may also be performed off-line by analyzing sensor signals recorded in real-time for later analysis.

The signal(s) filtered by the first filter bank 320 (e.g., filtered versions of the $A_w^z$ signal) may, for example, be provided to a band selector module 330. The band selector module 330 may then select a frequency band (or harmonic) of interest for the filtered signal. The band selector module 330 may perform such selection in any of a variety of manners non-limiting examples of which are presented herein.

As discussed herein, depending on the user and use of the system 300 (e.g., in a device with pedometer capability), either the first or second harmonic component may be dominant. In general, the second harmonic has been found to be dominant, so the second harmonic may be selected as the default harmonic component for further processing. However, if the band selector module 330 determines that the first harmonic component is dominant, the band selector will select the first harmonic component for further analysis instead of the second harmonic component.

The band selector module 330 is shown receiving an $N_b$ signal. Such signal may, for example, indicate whether valid walking behavior has been detected. The detection of valid walking may, in turn, enable the band selection functionality, for example as an indication that the band selector module 330 is processing valid data in making its band selection. Such operation may, for example, cause selection of the default band until it has been determined that valid walking is occurring and it has been determined that a band other than the default band should be analyzed.

Figure 4A:
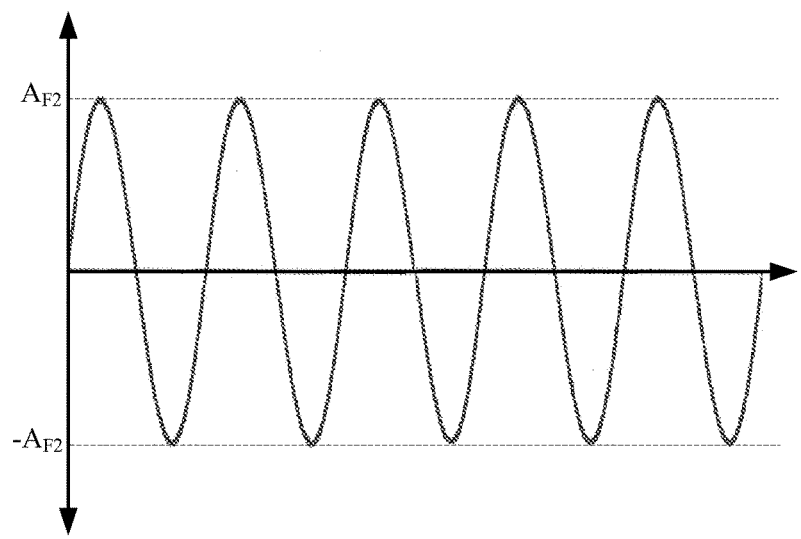
FIG. 4A shows a time domain output of a filter for a device being carried in a first manner, in accordance with various aspects of the present disclosure.
Figure 4B:
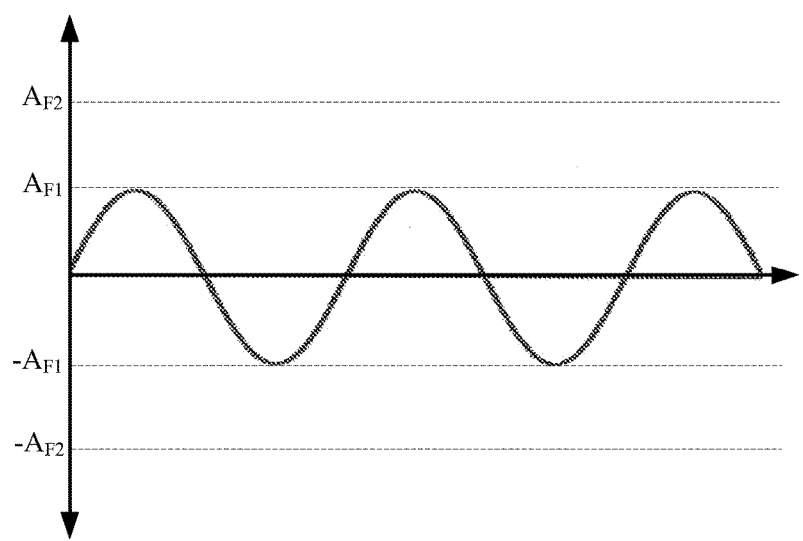
FIG. 4B shows a time domain output of a filter for a device being carried in a first manner, in accordance with various aspects of the present disclosure.

To select the best harmonic to process, the band selector module 330 may compare the respective energies of the two harmonics. For processing simplification and cost reduction, it is has been found that signal amplitudes (and/or squares thereof) are sufficient indications of energy, and thus the band selector module 330 may base its band selection on amplitude comparison. FIG. 4A shows an example time domain output of the second filter F2 that is designed to pass the frequency band containing the second harmonic of the accelerometer z-axis world coordinate signal. It should be noted that the signal is generally a discrete time signal (for example, updated at a 50 Hz rate or other rate), but is shown as a continuous time signal for illustrative clarity. FIG. 4B shows an example time domain output of the first filter F1 that is designed to pass the frequency band containing the first harmonic of the accelerometer z-axis world coordinate signal. Note that in the example implementation shown in FIG. 3, the first filter F1 and the second filter F2 both filter out DC or steady-state bias components.

In the examples shown in FIGS. 4A and 4B, which may for example represent a typical or default case (e.g., in which a device is carried in a pocket, backpack, belt clip, etc.), the magnitude of the second harmonic component, $A_{F2}$, is higher than the magnitude of the first harmonic component $A_{F1}$. In this case, the band selector module 330 will select the second harmonic component (e.g., the default component) for step count processing.

Figure 5A:
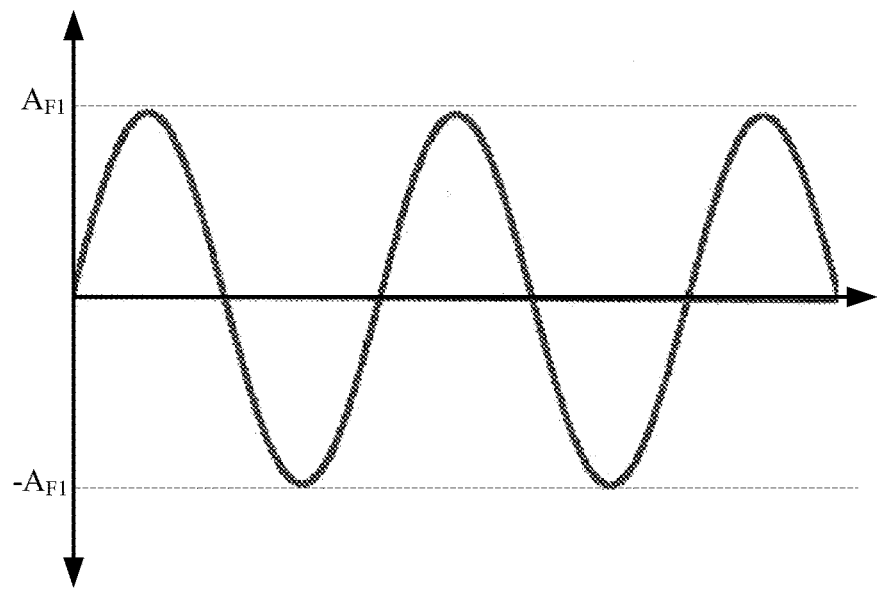
FIG. 5A shows a time domain output of a filter for a device being carried in a second manner, in accordance with various aspects of the present disclosure.
Figure 5B:
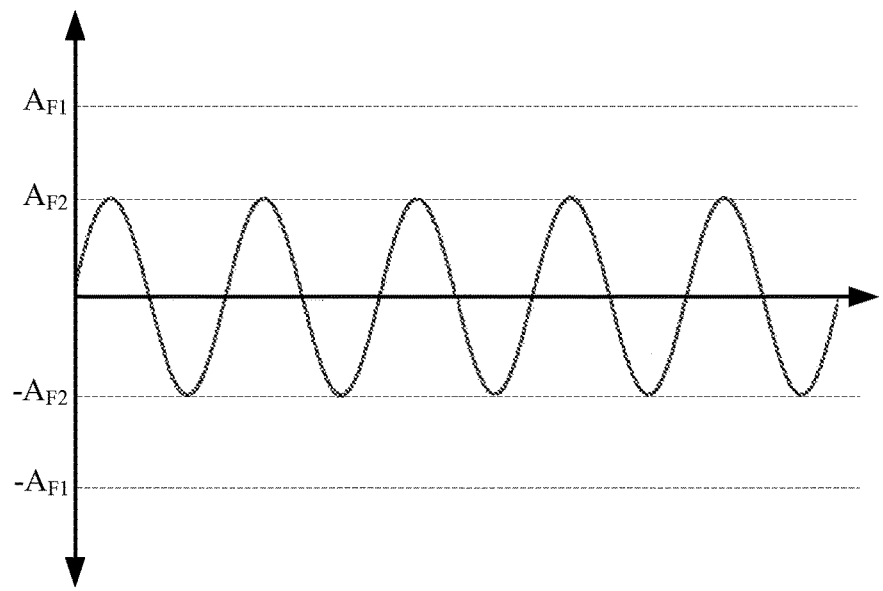
FIG. 5B shows a time domain output of a filter for a device being carried in a second manner, in accordance with various aspects of the present disclosure.

As another example, FIG. 5A shows an example time domain output of the first filter F1 that is designed to pass the frequency band containing the first harmonic of the accelerometer z-axis world coordinate signal. FIG. 5B shows an example time domain output of the second filter F2 that is designed to pass the frequency band containing the second harmonic of the accelerometer z-axis world coordinate signal.

In the examples shown in FIGS. 5A and 5B, which may for example represent usage scenario in which a device is being held in a hand swinging at the user's side, attached to the user's wrist, etc., the magnitude of the first harmonic component, $A_{F1}$, is higher than the magnitude of the second harmonic component $A_{F2}$. In this case, the band selector module 330 will select the first harmonic component for step count processing.

Though this discussion generally discusses selecting the first harmonic or second harmonic for processing, a plurality of harmonics may be selected and/or respective weighting factors applied to a plurality of respective harmonics based on their respective dominance. For example, in a scenario in which the respective energies of the first and second harmonics are substantially equal, the system 100 may determine to process both signals. Also for example, in a scenario in which the respective energies of the first and second harmonics are unequal, but in which the respective energies are both high enough to contain useful and/or reliable information, the system 100 may determine to process both signals, but give the dominant signal a higher weight.

Figure 6:
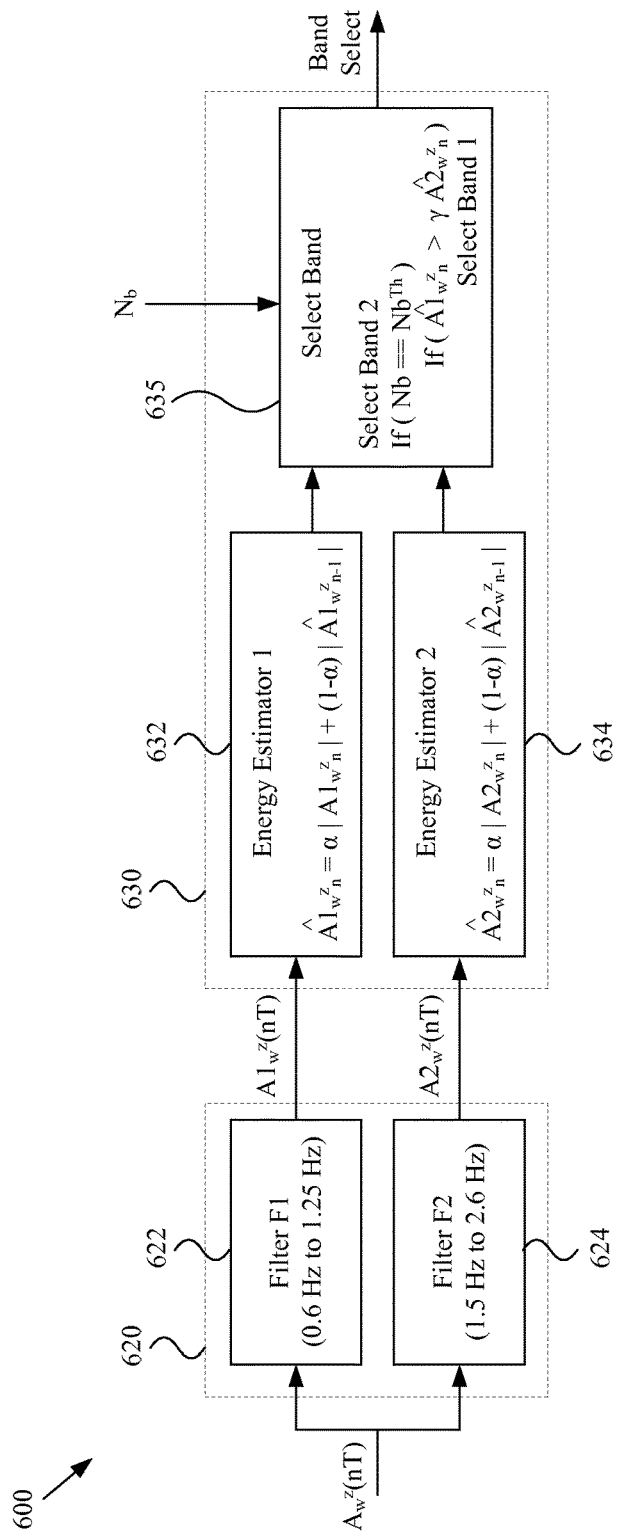
FIG. 6 shows an example filter bank and band selector module, in accordance with various aspects of the present disclosure.

FIG. 6 shows an example system 600 comprising a filter bank module 620 and a band selector module 630. The filter bank module 620 and the band selector module 630 may, for example, share any or all characteristics with the filter bank module 320 and band selector module 330 of the system 300 illustrated in FIG. 3 and discussed herein.

The first filter 622 and the second filter 624 of the filter bank module 620 each receive the accelerometer z-axis component in the world coordinate system and filter the received signal in accordance with their respective filter parameters. The filtered signals output from the filter bank module 620 are provided to the band selector module 630.

At the band selector module 630, the first energy estimator module 632 may, for example, receive the filtered output signal from the first filter 622, $A1_w^z$, and process the amplitude of the received signal with a first single-tap IIR filter. An example first single-tap IIR filter may, for example, operate in accordance with the equation:

$$\hat{A}1_{w\ n}^z = \alpha |A1_{w\ n}^z| + (1-\alpha)|\hat{A}1_{w\ n-1}^z| \qquad \text{Equation 1:}$$

The output of the first energy estimator module 632 may, for example, reflect an average amplitude of the $A1_w^z$ signal, and thus provide an indication of the average energy in the first frequency band (e.g., associated generally with the first harmonic component). The second energy estimator module 634 may, for example, receive the filtered output signal from the second filter 624, $A2_w^z$, and process the amplitude of the received signal with a second single-tap IIR filter. An example second single-tap IIR filter may, for example, operate in accordance with the equation:

$$\hat{A}2_{w\ n}^z = \alpha |A2_{w\ n}^z| + (1-\alpha)|\hat{A}2_{w\ n-1}^z| \qquad \text{Equation 2:}$$

The output of the second energy estimator module 634 may, for example, reflect an average amplitude of the $A2_w^z$ signal, and thus provide an indication of the average energy in the second frequency band (e.g., associated generally with the second harmonic component).

The select band module 635 may, for example, select the second harmonic as a default. The select band module 635 may also receive the first average amplitude signal from the first energy estimator module 632 and the second average amplitude signal from the second energy estimator module 634, and determine whether the first average amplitude is greater than the second average amplitude, or for example whether the first average amplitude is greater than the second average by a minimum margin, for example by a factor $\gamma$, where $0 < \gamma \le 1$, whether the first average amplitude is greater than the second average by a minimum constant value, etc. If the select band module 635 determines that the first average amplitude is greater than the second average amplitude and/or by at least a threshold margin, then the select band module 635 may select the first harmonic (and thus the output from the first filter 622) for step count processing.

The select band module 635 may then, for example, output a band select signal indicative of the band (e.g., the first band corresponding to the first harmonic or the second band corresponding to the second harmonic) that has been selected for step count processing.

As discussed herein, for example in the discussion of the system 300 shown in FIG. 3, the signal $N_b$ may also be provided to the band selector module 330. As shown in FIG. 6, the signal $N_b$ is input to the select band module 635 of the band selector module 630, for example to provide an indication of the validity of the present information being processed by the band selector module 630. For example, the select band module 635 may refrain from selecting the first harmonic instead of the default second harmonic in a scenario in which the input sensor data to the system 600 has not been validated, for example by an $N_b$ signal that has not reached a threshold number of counted steps $N_b^{Th}$ as is discussed in more detail herein (e.g., as may be generated by a step buffer module 360).

Continuing the discussion of FIG. 3, the step filter module 340 receives the band select signal from the band selector module 330 and at least the selected signal from the first filter F1 and/or second filter F2 corresponding to the selected frequency band (or harmonic), and processes the selected signal to identify the occurrence of user steps.

The step filter module 340 may, for example, perform various functions related to processing the selected signal to identify the occurrence of steps, non-limiting examples of which are provided herein. For example, as mentioned previously, the first filter F1 and/or second filter F2 may remove DC bias from the input signal. The step filter module 340 may, for example, detect zero crossings of the selected filtered signal, or zero crossings in a particular direction, to identify a valid step. For example, the step filter module 340 may detect all zero crossings of the selected filtered signal in the positive direction (alternatively, or in addition to the positive direction, a negative direction may be utilized).

The step filter module 340 may also, for example, determine whether a detected zero-crossing is associated with at least a threshold level of signal magnitude change. For example, a zero-crossing that is relatively small in magnitude may be due to noise, a frequency component different from the selected harmonic, etc., and may thus be ignored. On the other hand, a zero-crossing that is associated with a relatively large signal swing may be indicative of a detected user step. The zero-crossing amplitude threshold may, for example, be a constant, but may also be adaptable. For example, the threshold may be adjusted based on the overall amplitude of the signal, adjusted based on timing (e.g., making the threshold relatively difficult to meet in particular time periods and relatively easier to meet in other particular time periods), adjusted based on a measured and/or anticipated amount of noise (e.g., setting the zero-crossing amplitude threshold to a buffer amount above the noise amplitude), etc.

The step filter module 340 may additionally, for example, analyze the timing of a zero-crossing, for example to determine whether a detected zero-crossing occurred during a timeframe at which a zero-crossing or step would be expected. For example, a zero-crossing that happens too quickly relative to the previous zero-crossing may be ignored as a false detection. Also for example, a zero-crossing that happens too quickly relative to the previous zero-crossing may be analyzed with a higher zero-crossing threshold than a zero-crossing that happens near an expected time.

The step filter module 340 may output a signal indicative of detected zero-crossings that the step filter module 340 has determined have the potential to be valid indications of a user step. The output signal may, for example, be a digital pulse having a sufficient width to be reliably seen, a pulse that is resettable by a recipient of the pulse, etc.

The step filter module 340 may, for example, receive a mode signal from the Mode Indicator Branch of the system (or an equivalent thereof) that indicates whether walking or non-walking activity has been detected. Such a signal from the Mode Indicator Branch may provide a level of protection against false step detection, for example in a scenario in which user or device movement is caused by non-walking factors, such as travel in or on a vehicle. The mode signal will be discussed in more detail in the discussion of the Mode Indicator Branch.

The output of the step filter module 340 may be provided to a cadence estimator module 350. The cadence estimator module 350 may, for example, determine the general cadence of the user, for example based on the frequency of detected valid zero-crossings from the step filter module 340. The cadence estimator module 350 may, for example, output a user stepping rate (or frequency), an average time between steps, etc. The output of the cadence estimator module 350 may, for example, be provided to a step buffer module 360 and a missed step detection and correction module 355.

The step buffer module 360 may, for example, determine whether there has been enough potential walking activity to validate the walking activity. As discussed herein, the band selector module 330 receives an $N_b$ signal indicative of valid walking activity. The step buffer module 360 may, for example, generate such an $N_b$ signal. The $N_b$ signal may, for example, reflect a number of valid zero-crossings that have been detected until a threshold has been met.

For example, the step buffer module 360 may count valid zero-crossings, for example output from the step filter module 340, and determine that valid walking is occurring when the zero-crossing count reaches a threshold. The threshold may, for example, be five valid zero-crossings (e.g., in a particular direction). The threshold may, for example, be programmable. For example, the threshold may be set lower within a particular amount of time after valid walking activity had been detected and set higher after no walking activity has been detected within a particular amount of time.

In an example implementation, the step buffer module 360 accumulates valid zero-crossing detections until five of such zero-crossings have been detected. Then upon detection of the fifth valid zero-crossing, the step buffer module 360 may output a signal to the step counter module 365 indicating that five steps (or six steps, depending on the implementation) have been detected, and output a signal to the step counter module 365 at each valid detected zero-crossing thereafter, for example until being reset at which point counting to the threshold may begin again. The step buffer module 360 thus reduces the occurrence of false step detection. Note that the $N_b$ signal output to the step counter module 365 may, for example, be the same $N_b$ signal that is provided to the band selector module 330.

As mentioned previously, the cadence estimator module 350 outputs a signal indicative of the cadence of the user, for example a stepping rate and/or a time between steps. The missed step detection and correction module 355 receives the cadence output from the cadence estimator module 350 and identifies instances when a zero-crossing should have been detected but was not. For example, if valid zero-crossings are occurring at a regular rate, an expected zero-crossing is missed, and then the valid zero-crossings resume at the regular rate, the missed step detection and correction module 355 may output a signal to the step counter module 365 that indicates the occurrence of a missed zero-crossing. The missed step may thus be recovered in the step count. In an example implementation, the missed step detection and correction module 355 compares the duration between two consecutive steps to an expected duration between steps received from the cadence estimator module 350; and if the ratio of the duration between steps to the expected duration between steps is greater than a threshold, then the missed step detection and correction module 355 outputs a signal to the step counter module 365 that indicates the occurrence of a missed step.

The step buffer module 360, which generally indicates the occurrence of valid stepping activity, may be reset by the reset step buffer module 370, for example when the reset step buffer module 370 determines that valid stepping activity may have stopped. For example, the reset step buffer module 370 may comprise a timer, for example set to three seconds or some other number (e.g., a constant number, a programmable or adaptable number, etc.). Such timer may be reset by counted steps (e.g., as indicated by the step counter module 365). If the timer reaches its limit (e.g., by counting up to a threshold or counting down to zero), the reset step buffer module 370 may reset the step buffer module 360. In such a reset scenario, the step buffer module 360 may reset its initial zero-crossing counter $N_b$ to zero and start counting valid zero-crossings from zero until the threshold (e.g., five) is again met to indicate that valid stepping is again occurring.

The step counter module 365 may, for example, receive the $N_b$ signal from the step buffer module 360, from which the step counter module 365 will add $N_b$ zero-crossings (or their equivalent in steps) to the step count. The step counter module 365 will thereafter receive indications of single zero-crossings from the step buffer module 360 and/or the missed step detection and correction module 355. The step counter module 365, depending on the selected harmonic, will determine whether a valid zero-crossing corresponds to a single step, for example if the band corresponding to the second harmonic has been selected by the band selector 330, or corresponds to two steps, for example if the band corresponding to the first harmonic has been selected by the band selector 330. The step counter module 365 will then output a signal indicative of the total accumulated step count. The step counter module 365 may also, for example, output a signal indicative of cadence (e.g., a signal indicating a stepping rate, a time between steps, etc.).

As discussed herein, the example system 300 includes a Step Count Branch and a Mode Indicator Branch. The Step Count Branch was generally discussed above. The Mode Indicator Branch will now be discussed, though also with reference at times to the Step Count Branch.

As discussed herein, step count accuracy may be enhanced by a determination of whether periodic signals that would otherwise look to the system 300 as valid steps have a source that is unrelated to pedestrian activity (e.g., unrelated to walking, running, etc.). For example, it has been empirically determined that automotive travel may cause an accelerometer to output signals that may be confused with pedestrian activity. Accordingly, the Mode Indicator Branch analyzes the accelerometer signal(s) and/or other sensor signals, to ascertain whether the signal(s) analyzed to detect user steps are due to pedestrian activity or non-pedestrian activity.

Figure 7:
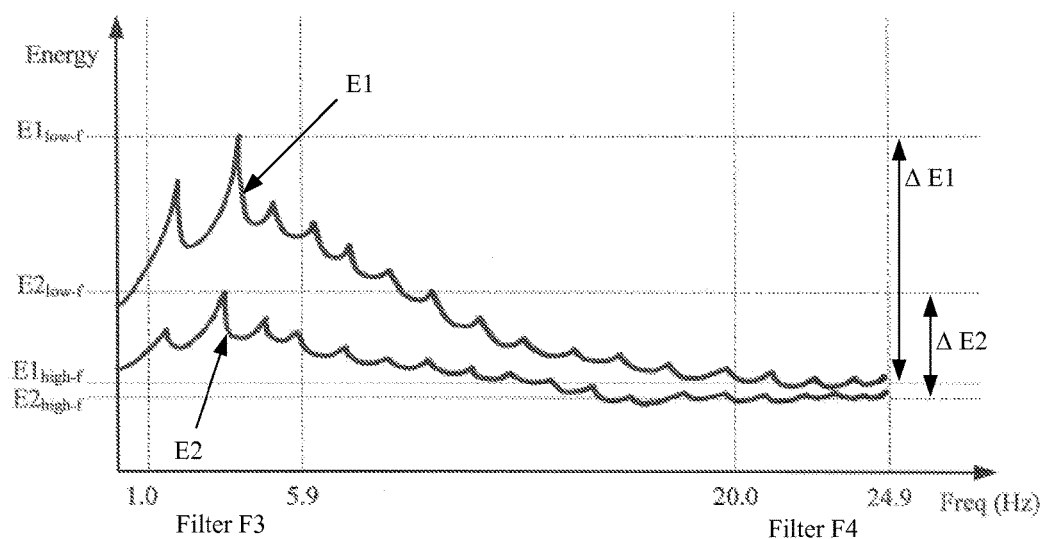
FIG. 7 shows example frequency spectrums associated with pedestrian and vehicle activity, in accordance with various aspects of the present disclosure.

Referring to FIG. 7, such figure shows example frequency spectra associated with pedestrian and vehicle activity, in accordance with various aspects of the present disclosure. For example, FIG. 7 shows a frequency spectrum of a walking-related signal E1 and a frequency spectrum of a vehicle-related signal E2. It has been empirically determined that the energy difference ΔE1 between the energy in a third band (e.g., 1.0 Hz to 5.9 Hz) and the energy in a fourth band (e.g., 20.0 Hz to 24.9 Hz) for pedestrian activity (e.g., walking, running, etc.) is substantially greater than the corresponding energy difference ΔE2 for vehicle activity (e.g., automobile, motorcycle, bus, plane, boat, ATV, etc.). The energy (or amplitude) difference may, for example, be in the 12-15 dB range. Thus, this energy difference may be analyzed to determine whether signal content that might otherwise be mistaken for walking activity or the like is actually due to vehicle travel.

Figure 8:
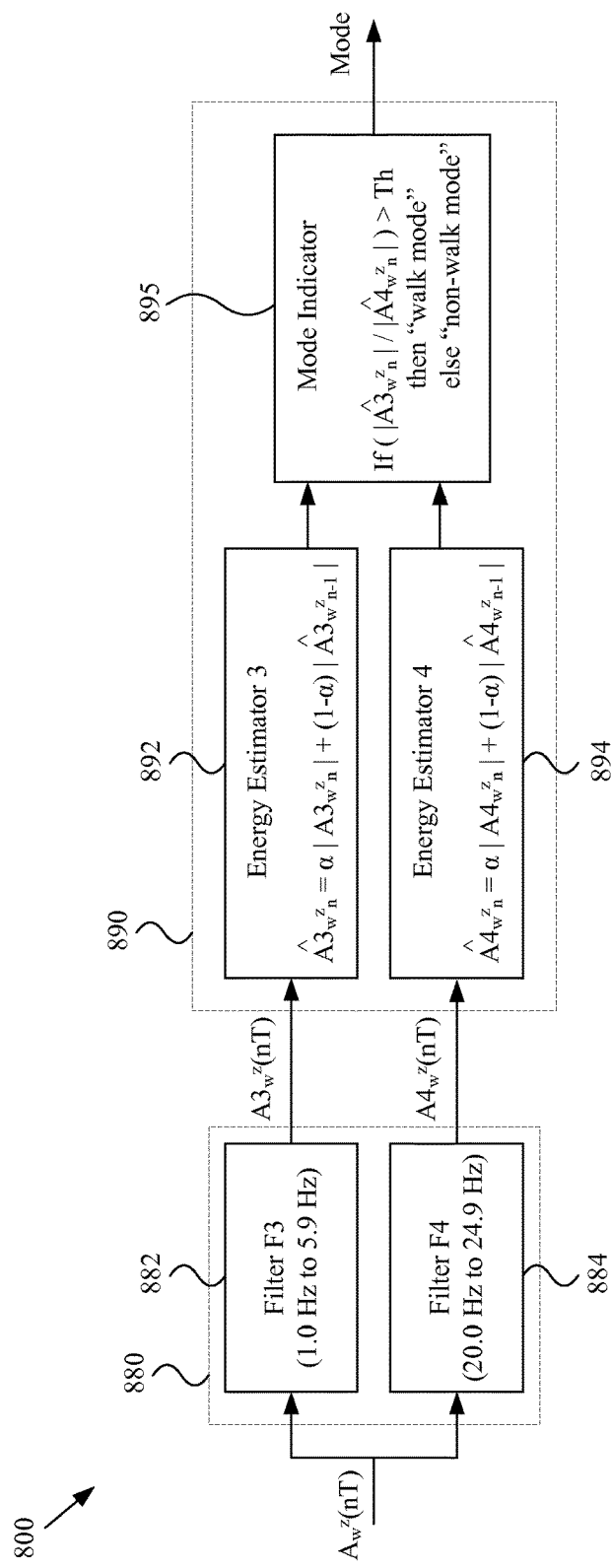
FIG. 8 shows an example filter bank and mode indicator module, in accordance with various aspects of the present disclosure.

An example of a manner in which such signal analysis is performed is provided in the Mode Indicator Branch. For example, a second filter bank 380 comprising a plurality of filters shares many characteristics with the first filter bank 320 discussed previously. The system 800 shown in FIG. 8 provides an example illustration of the second filter bank 380 of FIG. 3 at item 880. Additionally, the system 800 shown in FIG. 8 provides an example illustration of the mode indicator module 390 of FIG. 3 at item 890.

The third filter F3 882 and the fourth filter F4 884 each receive the accelerometer z-axis component in the world coordinate system and filter the received signal in accordance with their respective filter parameters. The filtered signals output from the filter bank module 880 are provided to the mode indicator module 890.

At the mode indicator module 890, the third energy estimator module 892 may, for example, receive the filtered output signal from the third filter 882, $A3_w^z$, and process the amplitude of the received signal with a third single-tap IIR filter. An example third single-tap IIR filter may, for example, operate in accordance with the equation:

$$\hat{A}3_{w\,n}^z = \alpha |A3_{w\,n}^z| + (1-\alpha)|\hat{A}3_{w\,n-1}^z|$$

Equation 3:

The output of the third energy estimator module 892 may, for example, reflect an average amplitude of the $A3_w^z$ signal, and thus provide an indication of the average energy in the third frequency band. The fourth energy estimator module 894 may, for example, receive the filtered output signal from the fourth filter 884, $A4_w^z$, and process the amplitude of the received signal with a fourth single-tap IIR filter. An example fourth single-tap IIR filter may, for example, operate in accordance with the equation:

$$\hat{A}4_{w\,n}^z = \alpha |A4_{w\,n}^z| + (1-\alpha)|\hat{A}4_{w\,n-1}^z|$$

Equation 4:

The output of the fourth energy estimator module 894 may, for example, reflect an average amplitude of the $A4_w^z$ signal, and thus provide an indication of the average energy in the fourth frequency band.

The mode indicator module 895 may, for example, receive the third average amplitude signal from the third energy estimator module 892 and the fourth average amplitude signal from the fourth energy estimator module 894, and determine whether the difference in amplitude (or energy), for example as a ratio, is high enough to be deemed indicative of pedestrian activity. For example, the mode indicator module 895 may determine a ratio between the average amplitude of the $A4_w^z$ and $A3_w^z$ signals and determine whether such ratio is above a particular threshold. The threshold may, for example, be set at some point within the empirically determined 9-12 dB difference in energy differential between walking or running activity and vehicle activity (e.g., at 10 dB, 10.5 dB, 11 dB, etc.). The threshold may also, for example, be programmable or adaptable based on monitored user activity and/or pedometer accuracy. The output of the mode indicator module 895 may, for example, be a signal indicative of whether the user is engaged in pedestrian activity (e.g., walking/running activity) or not (e.g., vehicle activity). For example, the output of the mode indicator module 895 may comprise a walk/non-walk signal.

Referring back to FIG. 2, the mode indicator module 390 may output the signal indicative of whether the user is engaged in pedestrian activity or not (e.g., a walk/non-walk signal) to the step filter module 340 of the Step Count Branch of the system 300, which is discussed herein. In an example implementation, the step filter module 340 may, for example, determine not to recognize zero-crossings as valid when the walk/non-walk signal indicates that the activity detected by the accelerometer is not due to pedestrian activity.

Figure 9:
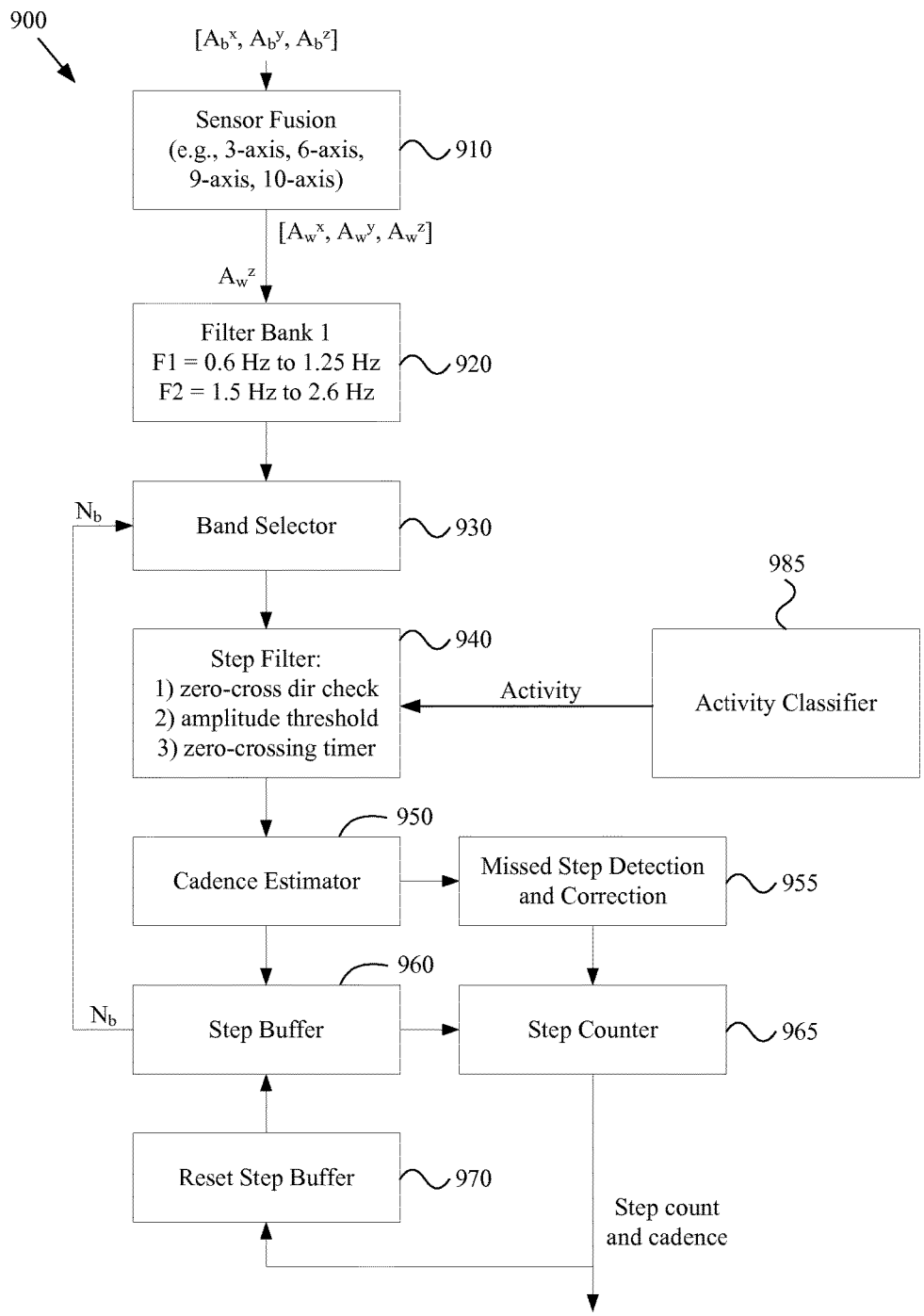
FIG. 9 shows an example multi-band step counting system, in accordance with various aspects of the present disclosure.

Another example implementation of a system that comprises step-counting functionality is provided at FIG. 9. For example, FIG. 9 shows an example multi-band step counting system 900, in accordance with various aspects of the present disclosure. The example system 900 may, for example, share any or all characteristics with the example system 100 illustrated in FIG. 1 and discussed herein. The example system 900 may also, for example, share any or all characteristics with the example systems 300, 600, and 800 illustrated in FIGS. 3, 6, and 8, and discussed herein. The discussion of the example system 900 will focus primarily on differences between the example system 900 and the example system 300 of FIG. 3.

Relative to the example system 300 of FIG. 3, the Mode Indicator Branch of the system 300 illustrated in FIG. 3 has been replaced with a general activity classifier module 985. For example, various systems, for example systems involving sensors in addition to an accelerometer (e.g., a gyro, compass, etc.) into which step counting (e.g., pedometer) functionality may be integrated may already comprise an activity classifier module that determines what the user of a device is doing. In such a scenario, the Mode Indicator Branch of FIG. 3 (e.g., the second filter bank 380 and the mode indicator module 390) may not be needed, instead relying on an activity signal output from the activity classifier module 985. The activity classifier module 985 may, for example, output the activity signal to indicate any of a variety of activities in which a user might be engaged. Examples of such activities include: walking, running, biking, riding in a car, riding on a motorcycle, swimming, surfing, riding in an airplane, sitting at a desk, etc. A non-limiting example of an activity classifier may, for example, be found in co-pending commonly owned U.S. patent application Ser. No. 14/464,999, filed Aug. 21, 2014, and titled "SYSTEM AND METHOD FOR ACTIVITY CLASSIFICATION," which is hereby incorporated herein by reference in its entirety.

The previous discussion of various systems presented a detailed description of such systems. The scope of various aspects of this disclosure is not limited to the details discussed previously. For example, FIGS. 10 and 11 present various high-level system diagrams for the illustration of various general aspects of this disclosure.

Referring to FIG. 10, such figure shows an example multi-band system 1000, in accordance with various aspects of the present disclosure. FIG. 10, for example, shows a system 1000 in which a frequency band of a signal is selected from a plurality of frequency bands of the signal to analyze for determining step count. The example system 1000 may, for example, share any or all characteristics with other example systems discussed herein (e.g. the system 100 of FIG. 1, the system 300 of FIG. 3, the system 600 of FIG. 6, the system 800 of FIG. 8, the system 900 of FIG. 9, etc.).

Input signal $S_1$ may, for example, comprise a z-axis component of an accelerometer vector in a world coordinate system as discussed above, but need not comprise such a signal. For example, the input signal $S_1$ may be or comprise other accelerometer-related signals, a coefficient of a rotation or transformation matrix, a signal associated with a gyro and/or compass, a signal associated with non-inertial sensors (e.g., a pressure sensor, a microphone, a temperature sensor, etc.).

In general, the select band module 1010 selects a frequency band of the input signal $S_1$ to analyze to determine a step count. The select band module 1010 may perform such a selection in any of a variety of manners, non-limiting examples of which are provided herein. For example, the select band module 1010 may perform such a selection based on frequency band energy level, based on energy levels in adjacent frequency bands, based on an activity signal indicative of a user's present activity, based on a signal from any of a variety of sensors indicative of a user's present activity, based on noise content in a frequency band, etc.

Once selected, the process band module 1020 may process the selected frequency band of the signal $S_1$ to identify steps. Various non-limiting examples of such processing are presented herein. Such processing may, for example, comprise analyzing zero-crossings, analyzing inflection points, analyzing critical points, analyzing frequency content, analyzing noise content, analyzing steady state bias, etc.

The determine step count module 1030 may, for example, analyze identified steps from the process band module 1020 to determine a step count. Various non-limiting examples of such processing are presented herein. Such processing may, for example, comprise accumulating steps, accumulating steps while valid stepping activity is occurring, etc.

Referring to FIG. 11, such figure shows a system 1100 in which one or more respective frequency bands of one or more signals are selected from a plurality of frequency bands of a plurality of signals to analyze for determining step count. The example system 1100 may, for example, share any or all characteristics with other example systems discussed herein (e.g. the system 100 of FIG. 1, the system 300 of FIG. 3, the system 600 of FIG. 6, the system 800 of FIG. 8, the system 900 of FIG. 9, the system 1000 of FIG. 10, etc.).

Input signal S may, for example, comprise one or more components (e.g., n components) of an accelerometer vector, one or more components of a gyroscope vector, one or more components of a compass vector, one or more components of any of a variety of non-inertial sensors, etc., but need not be such signals.

In general, the select signal(s) module 1110 and select band(s) module 1120 select at least one signal (e.g., m signals) and at least one frequency band (e.g., $X_0$-$X_1$) of each selected signal to analyze to determine a step count. The select signal(s) module 1110 and the select band(s) module 1120 may perform such a selection in any of a variety of manners, non-limiting examples of which are provided herein. For example, the select signal(s) module 1110 and the select band(s) module 1120 may perform such a selection based on frequency band energy level, based energy levels in adjacent frequency bands, based on an activity signal indicative of a user's present activity, based on a signal from any of a variety of sensors indicative of a user's present activity, based on noise content in a frequency band, based on a power-consumption based priority, etc.

Once selected, the process band(s) module 1130 may process the selected frequency band(s) of the selected signal(s) to identify steps. Various non-limiting examples of such processing are presented herein. Such processing may, for example, comprise analyzing zero-crossings, analyzing inflection points, analyzing critical points, analyzing frequency content, analyzing noise content, analyzing steady state bias, etc.

The determine step count module 1140 may, for example, analyze identified steps from the process band(s) module 1130 to determine a step count. Various non-limiting examples of such processing are presented herein. Such processing may, for example, comprise accumulating steps, accumulating steps while valid stepping activity is occurring, etc.

The systems illustrated in FIGS. 1-11, were presented to illustrate various aspects of the disclosure. Any of the systems presented herein may share any or all characteristics with any of the other systems presented herein. Additionally, it should be understood that the various modules were separated out for the purpose of illustrative clarity, and that the scope of various aspects of this disclosure should not be limited by arbitrary boundaries between modules. For example, any one or more of the modules may share hardware and/or software with any one or more other modules As discussed herein, any one or more of the modules and/or functions may be implemented by a processor (e.g., an application or host processor, a sensor processor, etc.) executing software instructions. Similarly, other embodiments may comprise or provide a non-transitory computer readable medium and/or storage medium, and/or a non-transitory machine readable medium and/or storage medium, having stored thereon, a machine code and/or a computer program having at least one code section executable by a machine and/or a computer (or processor), thereby causing the machine and/or computer to perform the methods as described herein.

In summary, various aspects of the present disclosure provide a system and method for efficiently and accurately counting user steps and general pedestrian activity. While the foregoing has been described with reference to certain aspects and embodiments, it will be understood by those

What is claimed is:

1. A pedometer system comprising: a sensor, a plurality of band-pass filters, and at least one module operable to, at least: receive a signal from the sensor; form a plurality of filtered sensor signals by, at least in part, filtering the received sensor signal with each of the plurality of band-pass filters; select a dominant filtered sensor signal from the plurality of filtered sensor signals; and count user steps based, at least in part, on the selected dominant filtered sensor signal, wherein the at least one module is operable to select a dominant filtered sensor signal by, at least in part: determining a respective indication of energy for each of the plurality of filtered sensor signals; selecting as the dominant filtered sensor signal the filtered sensor signal of the plurality of filtered sensor signals with the highest respective indication of energy; and adapting a relation between a rate at which the user steps are counted and a frequency of the selected dominant filtered sensor signal by counting user steps at twice a primary frequency of the dominant filtered sensor signal when the dominant filtered sensor signal is a first of the plurality of filtered sensor signals and counting user steps at a primary frequency of the dominant filtered sensor signal when the dominant filtered sensor signal is a second of the plurality of filtered sensor signals.

2. The pedometer system of claim 1, wherein the at least one module is operable to determine whether a threshold number of steps have occurred, and increment a step count only after the threshold number of steps have occurred.

3. The pedometer system of claim 1, wherein the at least one module is operable to determine whether a threshold number of steps have occurred, and select a dominant filtered sensor signal only after the threshold number of steps have occurred.

4. The pedometer system of claim 1, wherein the at least one module is operable to determine a cadence, and count user steps based, at least in part, on the determined cadence.

5. The pedometer system of claim 4, wherein the at least one module is operable to identify a missed step based, at least in part, on the determined cadence.

6. The pedometer system of claim 1, wherein the at least one module is operable to count user steps by, at least in part, detecting zero crossings of the dominant filtered sensor signal that are associated with signal swings of at least a threshold magnitude.

7. The pedometer system of claim 6, wherein the at least one module is operable to count user steps by, at least in part, comparing a time of a detected zero crossing to an expected time for a zero crossing.

8. The pedometer system of claim 1, wherein determining a respective indication of energy for each of the plurality of filtered sensor signals comprises filtering a respective amplitude of each of the plurality of filtered sensor signals with a respective Infinite Impulse Response (IIR) filter.

9. The pedometer system of claim 1, wherein the received sensor signal comprises an accelerometer 2-axis signal expressed in a world coordinate system.

10. The pedometer system of claim 9, wherein the at least one module is operable to receive the sensor signal from a sensor fusion module that converts an accelerometer signal expressed in a body coordinate system to an accelerometer signal expressed in the world coordinate system.

11. A pedometer system comprising: a sensor, a plurality of filters, and at least one module operable to, at least: receive a signal from the sensor; select a frequency band of the received sensor signal; determine if the user is engaged in a non-stepping activity; and if the user is not engaged in a non-stepping activity, then count user steps based, at least in part, on the received signal in the selected frequency band, such that a relation between a rate at which the user steps are counted and a frequency of the selected frequency band is adapted so that user steps are counted at twice a primary frequency of a dominant filtered sensor signal when the dominant filtered sensor signal is a first of a plurality of filtered sensor signals and user steps are counted at a primary frequency of the dominant filtered sensor signal when the dominant filtered sensor signal is a second of the plurality of filtered sensor signals, wherein the at least one module is operable to determine if the user is engaged in a non-stepping activity by, at least in part, forming a first filtered sensor signal by, at least in part, filtering the received sensor signal with a first filter, determining a first indication of energy for the first filtered sensor signal, forming a second filtered sensor signal by, at least in part, filtering the received sensor signal with a second filter; determining a second indication of energy for the second filtered sensor signal and comparing the first indication of energy to the second indication of energy to discriminate between stepping activity and non-stepping activity.

12. The pedometer system of claim 11, wherein the non-stepping activity comprises vehicle travel.

13. The pedometer system of claim 11, wherein the at least one module is operable to determine if the user is engaged in a non-stepping activity by, at least in part, analyzing a signal received from an activity classifier module.

14. A pedometer system comprising: a sensor, a plurality of band-pass filters, and at least one module operable to, at least: receive a signal from the sensor that comprises a plurality of harmonics; analyze the harmonics to identify a dominant harmonic by determining a respective indication of energy for each of the plurality of harmonics and selecting as the dominant harmonic the harmonic with the highest respective indication of energy; and count user steps based, at least in part, on the selected dominant harmonic, wherein a relation between a rate at which the user steps are counted and a frequency of the selected dominant harmonic is adapted by counting user steps at twice a primary frequency of the dominant filtered sensor signal when the dominant filtered sensor signal is a first of the plurality of filtered sensor signals and counting user steps at a primary frequency of the dominant filtered sensor signal when the dominant filtered sensor signal is a second of the plurality of filtered sensor signals.

15. The pedometer system of claim 14, wherein the second of the plurality of harmonics is a default dominant harmonic.

* * * * *